United States Patent
Park et al.

(10) Patent No.: US 8,179,507 B2
(45) Date of Patent: May 15, 2012

(54) LIQUID CRYSTAL DISPLAY DEVICE

(75) Inventors: Ku Hyun Park, Uiwang-si (KR); Hyun Ho Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 219 days.

(21) Appl. No.: 12/314,698

(22) Filed: Dec. 15, 2008

(65) Prior Publication Data
US 2009/0167998 A1     Jul. 2, 2009

(30) Foreign Application Priority Data
Dec. 31, 2007 (KR) .................. 10-2007-0141311

(51) Int. Cl.
*G02F 1/1335* (2006.01)
(52) U.S. Cl. ......... 349/114; 349/113; 349/141; 349/142
(58) Field of Classification Search .......... 349/113–114, 349/141–142
See application file for complete search history.

(56) References Cited

U.S. PATENT DOCUMENTS

| | | | |
|---|---|---|---|
| 2004/0233360 A1 * | 11/2004 | Yoshida et al. | 349/114 |
| 2005/0264720 A1 * | 12/2005 | Itou et al. | 349/99 |
| 2006/0256264 A1 * | 11/2006 | Yang et al. | 349/114 |
| 2006/0268206 A1 | 11/2006 | Nishimura | |
| 2007/0013835 A1 | 1/2007 | Matsushima et al. | |

* cited by examiner

*Primary Examiner* — Phu Vu
(74) *Attorney, Agent, or Firm* — McKenna Long & Aldridge, LLP

(57) ABSTRACT

A liquid crystal display device includes: a first substrate including a transmission part and a reflection part; a common electrode disposed on the transmission part and the reflection part; a plurality of first pixel electrodes disposed on the transmission part and having a first electrode direction; a plurality of second pixel electrodes disposed on the reflection part and having a second electrode direction, the first electrode direction and the second electrode direction creating an acute angle; a second substrate facing the first substrate; and a liquid crystal layer interposed between the first and second substrates.

14 Claims, 6 Drawing Sheets

LIQUID CRYSTAL DISPLAY DEVICE

This application claims the benefit of Korean Patent Application No. 2007-0141311, filed on Dec. 31, 2007, which is hereby incorporated by reference for all purposes as if fully set forth herein.

BACKGROUND OF THE INVENTION

1. Field of the Invention

The present invention relates to a liquid crystal display device. More particularly, the present invention relates to a transflective liquid crystal display device.

2. Discussion of the Related Art

A liquid crystal display device may be classified into a transmissive liquid crystal display device, which uses a backlight unit as a light source, and a reflective liquid crystal display device that uses natural light as a light source.

The transmissive liquid crystal display uses a backlight unit as a light source, thereby displaying a bright image in a dark environment. However, since the transmissive liquid crystal display uses the backlight unit, power consumption is increased. Since the reflective liquid crystal display device uses natural light in environment instead of the backlight unit, power consumption is reduced. However, the reflective liquid crystal display device cannot be used in a dark environment.

In order to solve theses problems, a transflective liquid crystal display device has been proposed. Since the transflective liquid crystal display device has only the advantages of the transmissive and reflective liquid crystal display devices, the transflective liquid crystal display device can be used in a dark environment while consuming relatively low power.

The transflective liquid crystal display device includes a reflection part and a transmission part. Further, the transflective liquid crystal display device additionally has a process of forming a reflection sheet in the reflection part, as compared with a typical transmissive liquid crystal display.

According to the transflective liquid crystal display device, the reflection part and the transmission part can be recognized by turning backlight on or off. In general, a cell gap of the transmission part is approximately twice as great as that of the reflection part.

Liquid crystal provided in the transflective liquid crystal display device according to the prior art has a narrow viewing angle due to birefringence characteristics thereof. The liquid crystal adopts an ECB (electrically controlled birefringence) mode using interference between ordinary ray and extraordinary ray of incident light. However, in the ECB mode, since a polarization state may vary depending on a dual cell gap between the reflection part and the transmission part, light transmittance may deteriorate. In order to compensate for deterioration of the light transmittance, the ECB mode transflective liquid crystal display device requires at least four compensation films.

Thus, the related art transflective liquid crystal display device must have an ECB mode liquid crystal in order to improve the viewing angle characteristics. However, since the ECB mode liquid crystal requires an additional compensation film, the manufacturing cost of the related art transflective liquid crystal display device is increased.

SUMMARY OF THE INVENTION

Accordingly, the present invention is directed to a liquid crystal display device that substantially obviates one or more of the problems due to limitations and disadvantages of the related art.

An advantage of the present invention is to provide a liquid crystal display device capable of improving a viewing angle without using an additional compensation film, and improving optical efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes: a first substrate including a transmission part and a reflection part; a common electrode disposed on the transmission part and the reflection part; a plurality of first pixel electrodes disposed on the transmission part and having a first direction; a plurality of second pixel electrodes disposed on the reflection part and having a second direction; a second substrate facing the first substrate; and a liquid crystal layer interposed between the first and second substrates.

In another aspect of the present invention, a method for manufacturing a liquid crystal display device includes the steps of: providing a first substrate including a transmission part and a reflection part; forming a common electrode on the transmission part, a plurality of first pixel electrodes having a first direction on the transmission part, and a plurality of second pixel electrodes having a second direction on the reflection part; providing a second substrate facing the first substrate; and forming a liquid crystal layer interposed between the first and second substrates.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to an embodiment of the present invention, example of which is illustrated in the accompanying drawings.

Figure 1:
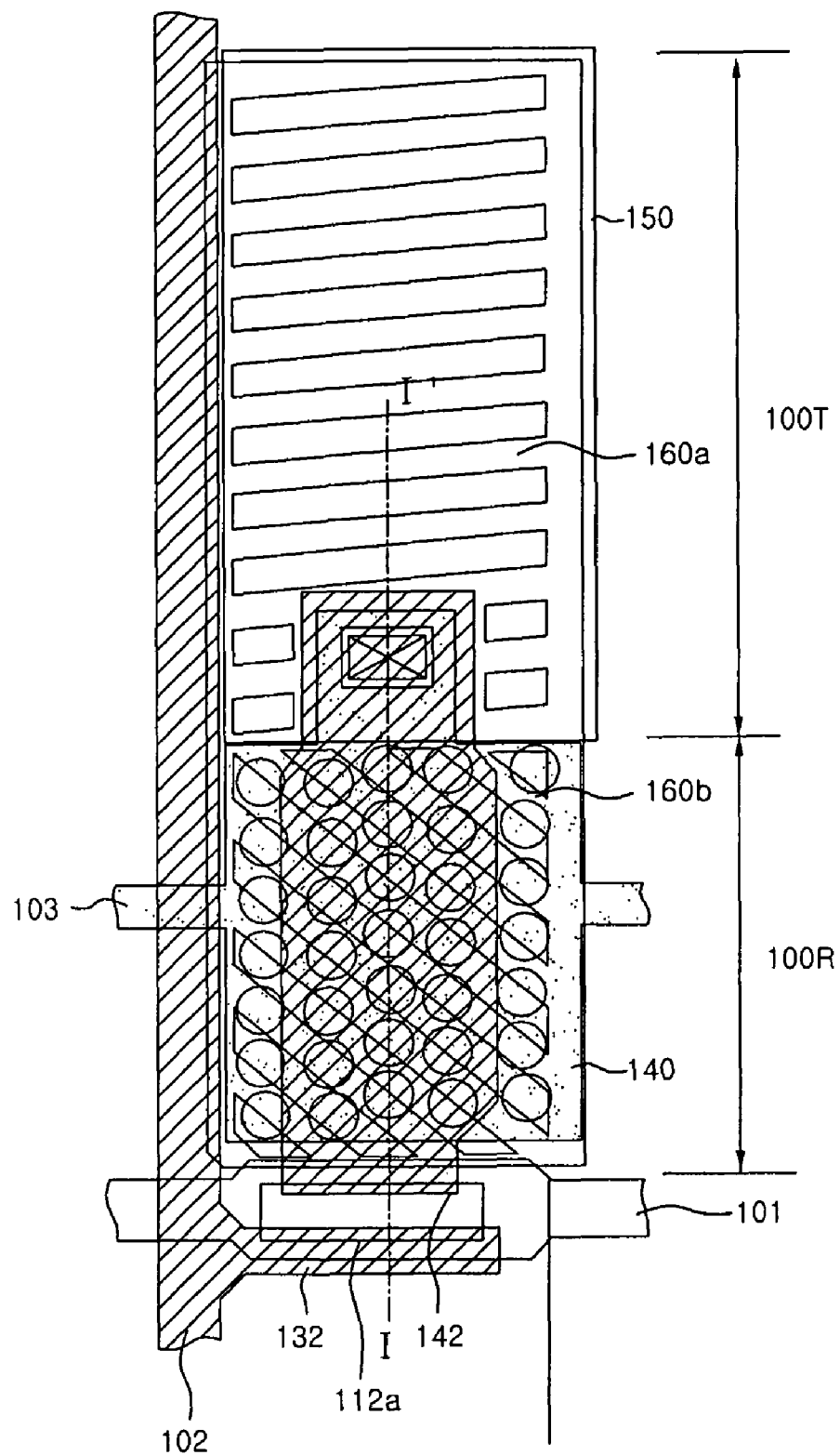
FIG. 1 is an enlarged view illustrating one pixel of a liquid crystal display device according to the embodiment.
Figure 2:
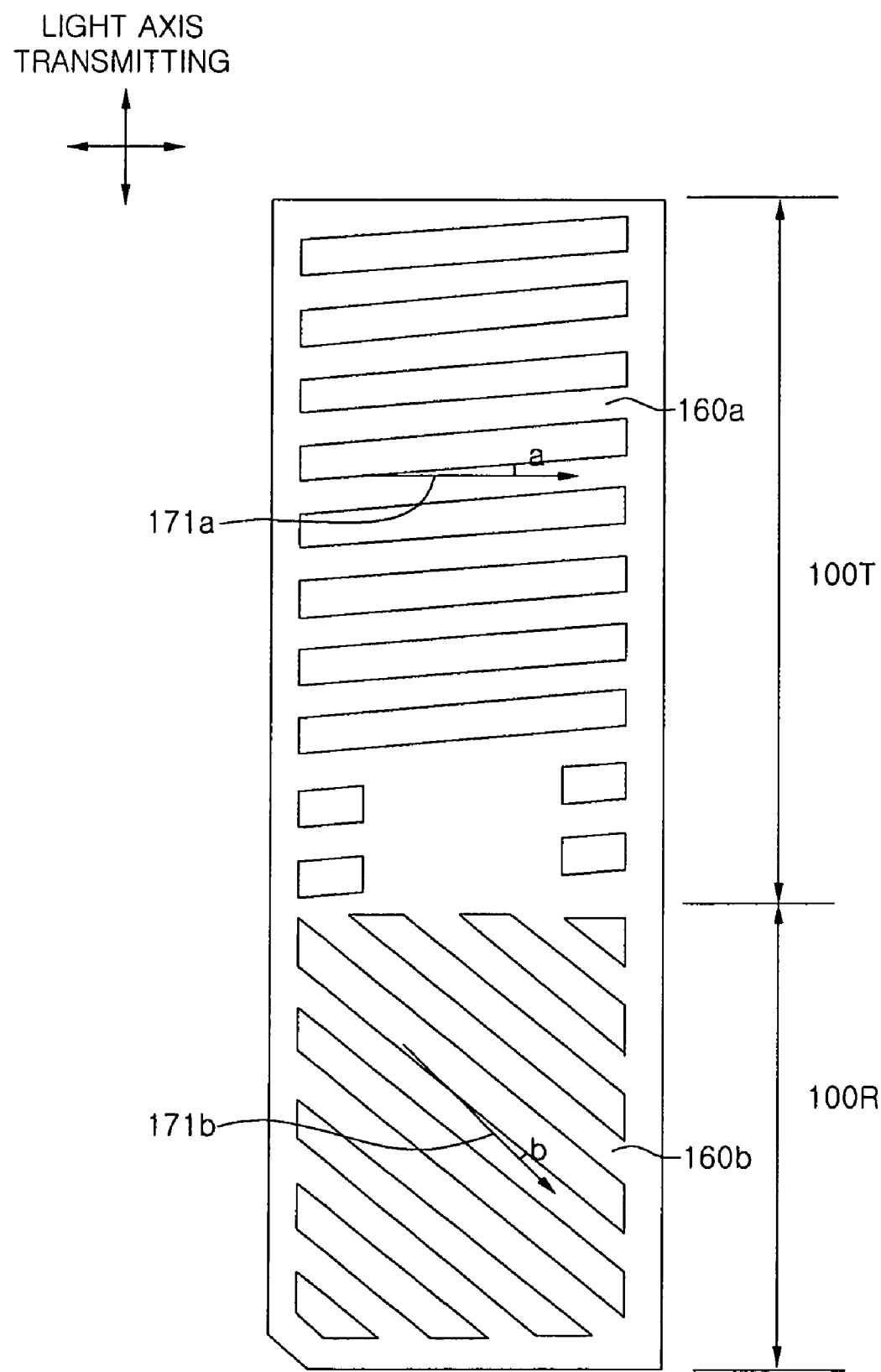
FIG. 2 is a plan view illustrating the electrode structure shown in FIG. 1.
Figure 3:
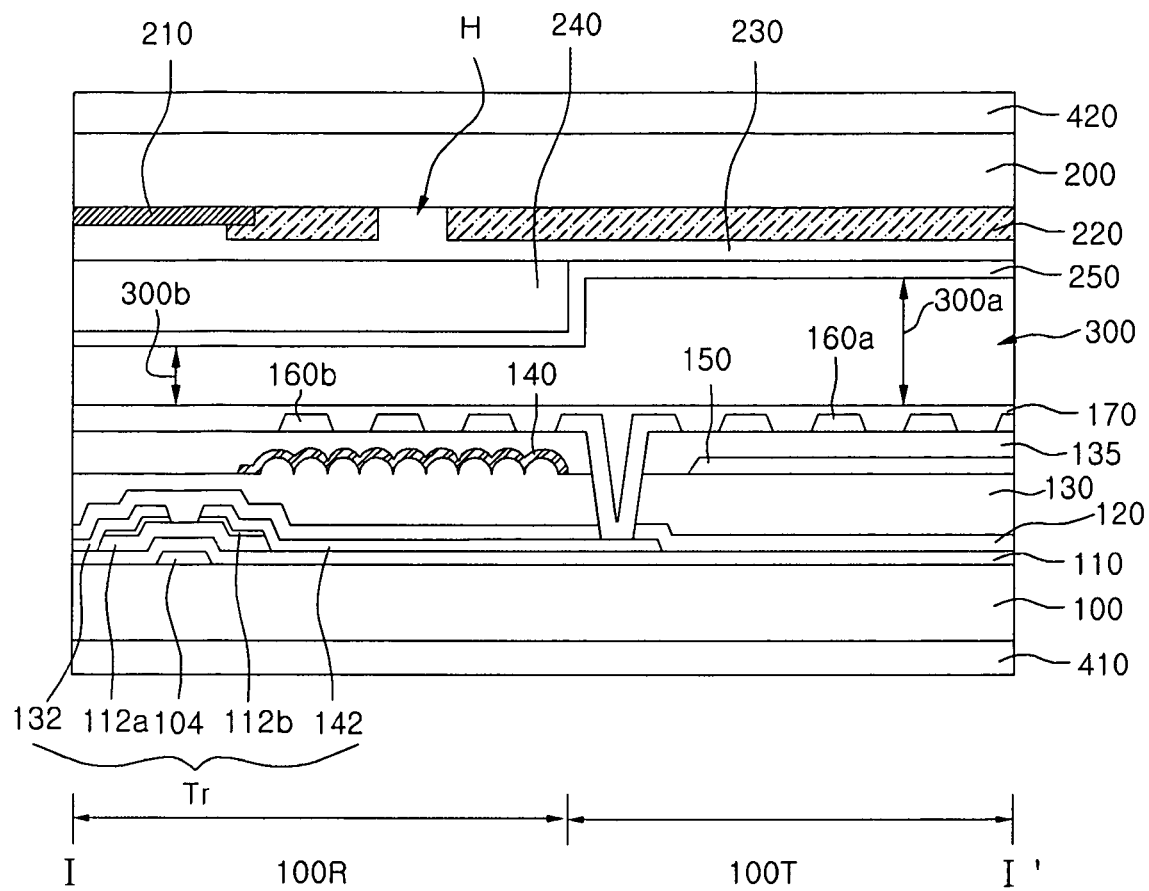
FIG. 3 is a sectional view taken along line I-I'.

FIGS. 1 to 3 are views illustrating a liquid crystal display device according to the embodiment. FIG. 1 is an enlarged view illustrating one pixel of the liquid crystal display device according to the embodiment, FIG. 2 is a plan view illustrating the electrode structure shown in FIG. 1, and FIG. 3 is a sectional view taken along line I-I'.

Referring to FIGS. 1 to 3, the liquid crystal display device includes first and second substrates 100 and 200 facing each other, and a liquid crystal layer 300 interposed between the first and second substrates 100 and 200.

The first substrate 100 includes a gate line 101 and a data line 102 that cross each other. A gate insulating layer 110 is interposed between a gate line 101 and a data line 102. The gate line 101 crosses the data line 102, thereby defining a pixel, which is a minimum unit for displaying an image, in the first substrate 100.

The first substrate 100 further includes a common line 103 disposed in parallel to the gate line 101. The pixel includes a light transmission part 100T and a light reflection part 100R.

A thin film transistor Tr is disposed in the pixel, e.g. the reflection part 100R. The thin film transistor Tr includes a gate electrode 104, semiconductor patterns, a gate insulating layer 110, a source electrode 132 and a drain electrode 142. The gate electrode 104 is electrically connected with the gate line 101, and the source electrode 132 is electrically connected with the data line 102, so that the thin film transistor Tr is electrically connected with the gate line 101 and the data line 102. Further, the semiconductor patterns are classified into an active pattern 112a, and an ohmic contact pattern 112b. The ohmic contact pattern 112b is interposed between the active pattern 112a and the source electrode 132, and between the active pattern 112a and the drain electrode 142.

A protective layer 120 and a first insulating layer 130 are disposed on the first substrate 100 including the thin film transistor Tr. The protective layer 120 includes silicon oxide or silicon nitride.

The first insulating layer 130 includes embossing sections 130a corresponding to the light reflection part 100R. Refer to FIG. 1, the embossing sections 130a are arranged randomly, which improves light transmittance. The first insulating layer 130 may have a planar surface corresponding to the light transmission part 100T. The first insulating layer 130 includes an organic insulating layer, e.g. acryl-based resin, polystyrene resin, polyamide resin, polyimide resin, polyarylether resin, heterocyclic polymer resin, parylene resin, benzocyclobutene-based resin, polyacrylonitrile resin or the like.

A reflective common electrode 140 is disposed, which covers the light reflection part 100R, i.e. the embossing sections 130a. The reflective common electrode 140 includes metal capable of reflecting light, e.g. Al, AlNd, Ag, Mo or the like. The reflective common electrode 140 can be electrically connected with the common line 103, or can be integrally formed with the common line 103 (not shown in FIG.s).

A transmissive common electrode 150 is disposed on the first insulating layer 130 of the light transmission part 100T. The transmissive common electrode 150 includes light permeable conductive material, e.g. ITO, IZO or the like. The transmissive common electrode 150 is electrically connected with the reflective common electrode 140 shown in FIG. 3. In detail, the transmissive common electrode 150 is electrically connected with the reflective common electrode 140 at the boundary between the light reflection part 100R and the light transmission part 100T. The reflective common electrode 140 constitutes a common electrode, which forms the horizontal electric field with respect to first and second pixel electrodes 160a and 160b and liquid crystal molecules, together with the transmissive common electrode 150. Thus, the transflective liquid crystal display device according to the embodiment can improve the viewing angle.

A second insulating layer 135 is disposed on the first substrate 100 including the reflective common electrode 140 and the transmissive common electrode 150. The second insulating layer 135 isolates the reflective common electrode 140 from the second pixel electrode 160b, and isolates the transmissive common electrode 150 from the first pixel electrode 160a. The second insulating layer 135 includes silicon oxide or silicon nitride.

The first and second pixel electrodes 160a and 160b, which are electrically connected with the drain electrode 142 of the thin film transistor Tr, are disposed on the second insulating layer 135.

The pixel electrode includes a plurality of first pixel electrodes 160a, which are disposed in the light transmission part 100T, and a plurality of second pixel electrodes 160b, which are disposed in the light reflection part 100R.

The first pixel electrode 160a has an electrode direction different from that of the second pixel electrode 160b. In detail, the first pixel electrode 160a has an electrode first direction and the second pixel electrode 160b has an electrode second direction. The first electrode direction and the second electrode direction create an acute angle. At this time, the first direction may be inclined at an angle of 30° to 60° with respect to the second direction. Further, the highest optical efficiency is achieved when the first direction is inclined at an angle of 45° with respect to the second direction. For example, the first pixel electrode 160a may be inclined at a positive angle of 5° with respect to the gate line 101, and the second pixel electrode 160b may be inclined at a negative angle of 40° with respect to the gate line 101.

An alignment layer 170 is disposed on the first substrate 100 including the first and second pixel electrodes 160a and 160b. Refer to FIG. 2, the alignment layer 170 includes a first alignment layer, which has a first alignment direction 171a in the light transmission part 100T, and a second alignment layer that has a second alignment direction 171b in the light reflection part 100R.

In order to match the liquid crystal driving characteristic of the light transmission part 100T with the liquid crystal driving characteristic of the light reflection part 100R, the first alignment direction may be inclined at an angle of 40° to 50° with respect to the second alignment direction. At this time, when the first alignment direction is inclined at an angle of 45 with respect to the second alignment direction, the viewing angle is significantly improved. Referring to FIG. 2, the alignment layer 170 may have an alignment angle (a and b) of 5° to 20° with respect to the directions of the first and second pixel electrodes 160a and 160b in order to improve the optical efficiency and to match the driving characteristics of the light reflection part 100R with the driving characteristics of the light transmission part 100T. For example, the first alignment direction is parallel to the gate line 101, and the second alignment direction forms a negative angle of 45° relative to the gate line 101. Thus, the light transmission part 100T can improve the light transmittance and the light reflection part 100R can improve the light reflectance.

Further, the first pixel electrode 160a forms an angle of 45° relative to the first alignment layer in the light transmission part 100T and the second pixel electrode 160b forms an angle of 45° relative to the second alignment layer in the light reflection part 100R. Thus, the driving characteristics of the light reflection part 100R match with the driving characteristics of the light transmission part 100T, so that the viewing angle characteristics can be improved and a contrast ratio can also be improved.

Furthermore, the first and second pixel electrodes 160a and 160b are inclined with respect to the first and second alignment layers at a predetermined angle, respectively, so that the response speed of the liquid crystal can be improved.

Meanwhile, a color filter pattern 220 and a black matrix 210 are disposed on the second substrate 200 corresponding to the first substrate 100. The color filter pattern corresponding to the light reflection part 100R may be formed with a hole H for increasing incident light.

An overcoat layer 230 is disposed on the second substrate 200 including the color filter pattern 220 and the black matrix 210. An overcoat pattern 240 is disposed on the overcoat layer 230 corresponding to the light reflection part 100R. Thus, the cell gap 300a of the light transmission part 100T has a value greater than that of the cell gap 300b of the light reflection part 100R, so that the light transmittance can be improved.

In addition, an edge portion of the overcoat pattern 240 can be covered by the reflective common electrode 140. In detail, step difference caused by the overcoat pattern 240 can be covered by the reflective common electrode 140. The reason for covering the step difference is because light leakage may occur due to disclination of the liquid crystal if the step difference exists. The reflective common electrode 140 prevents the light leakage from occurring due to the step difference.

According to the embodiment, the cell gap is adjusted by the overcoat pattern 240. However, the scope of the present invention is not limited thereto. In detail, the cell gap can also be adjusted by a pattern of the second insulating layer 135 formed on the first substrate 100.

An alignment layer 250 may be further disposed on the second substrate 200 including the overcoat pattern 240.

Meanwhile, first and second polarizing members 410 and 420 are disposed at the outer sides of the first and second substrates 100 and 200, respectively. The first and second polarizing members 410 and 420 may have optical axes perpendicular to each other. For example, one of the optical axis of one of the first and second polarizing members 410 and 420 is parallel to the first alignment direction.

Although not shown in the drawings, a backlight unit is provided below the first polarizing member 410.

Further, the alignment directions of the light transmission part 100T and the light reflection part 100R are adjusted without using an additional compensation film, so that the driving characteristics of the light transmission part 100T can match with the driving characteristics of the light reflection part 100R.

Furthermore, the pixel electrodes of the light transmission part 100T and the light reflection part 100R have directivities different from each other, so that the viewing angle can be significantly improved.

Moreover, the directions of the pixel electrodes and the alignment directions of the alignment layers are controlled, so that the light transmittance can be improved without using an additional compensation film.

Figure 4:
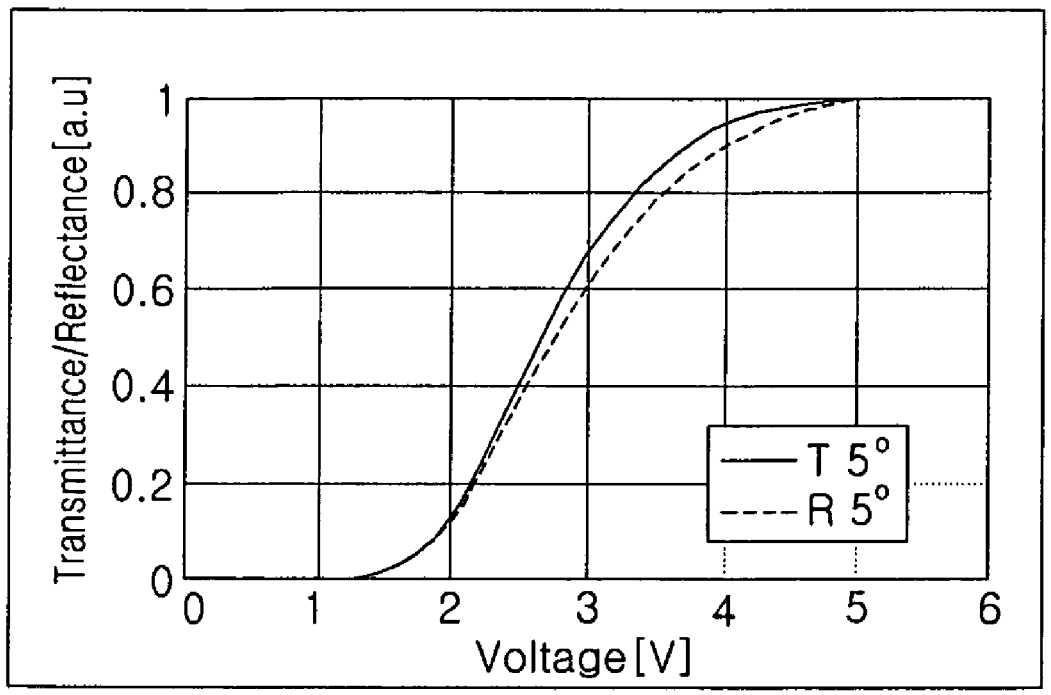
FIG. 4 is a graph showing the driving characteristics of a light transmission part and a light reflection part of a transflective liquid crystal display device according to the embodiment.

FIG. 4 is a graph showing the driving characteristics of the light transmission part and the light reflection part in the transflective liquid crystal display device according to the embodiment.

Figure 5:
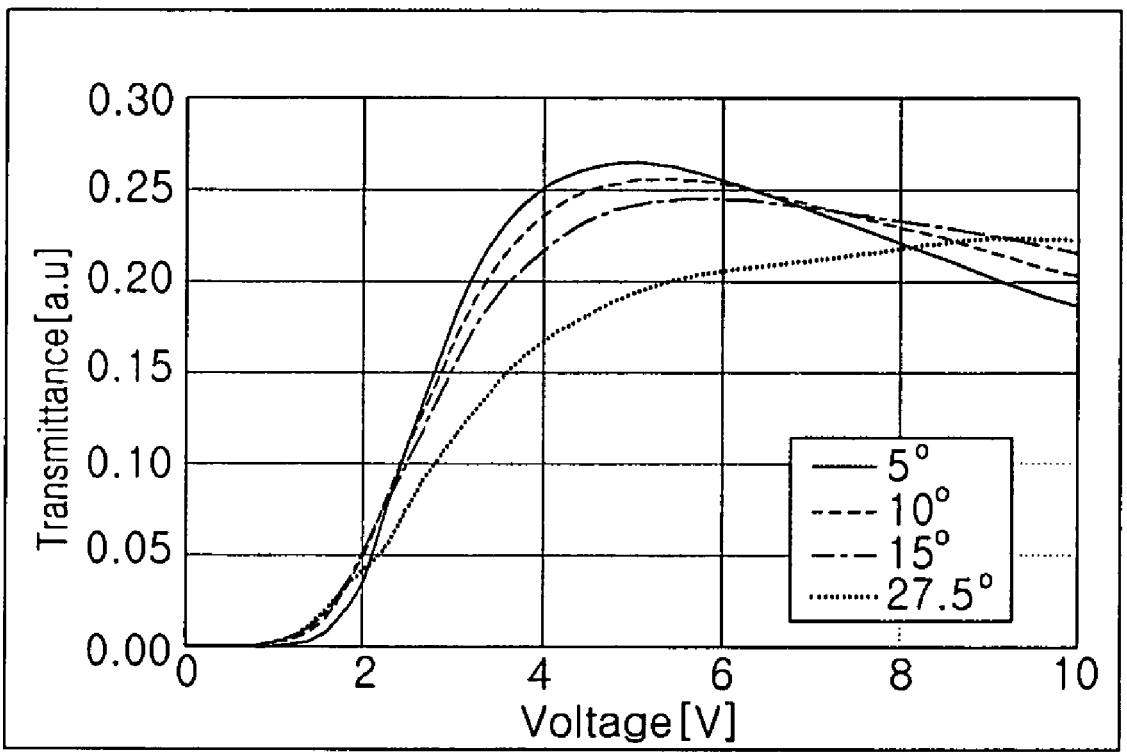
FIG. 5 is a graph showing transmittance as a function of voltage based on an angle of alignment direction with respect to a pixel electrode in a light transmission part of a transflective liquid crystal display device according to the embodiment.
Figure 6:
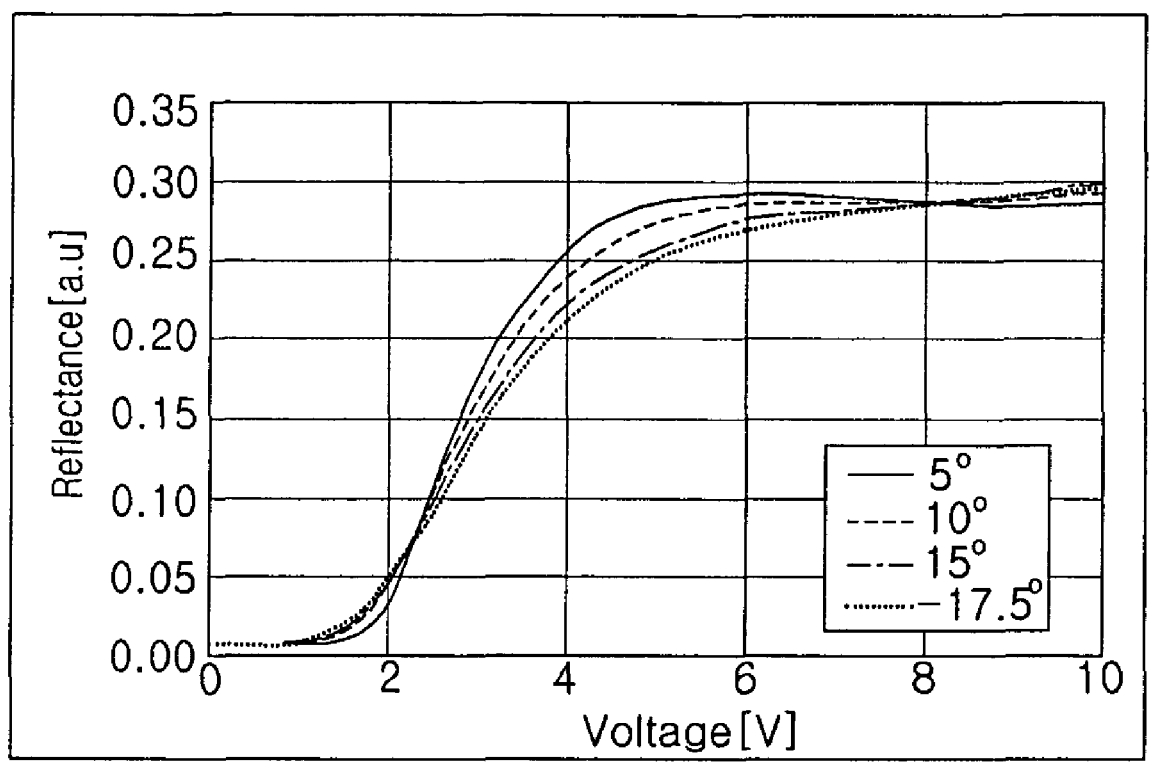
FIG. 6 is a graph showing reflectance as a function of voltage based on an angle of alignment direction with respect to a pixel electrode in a light reflection part of a transflective liquid crystal display device according to the embodiment.

FIG. 4 is a drawing of integrating FIG. 5 with FIG. 6. As shown in FIG. 4, when the angle of 5° exists between the direction of the pixel electrode and the alignment direction, the driving characteristics of the light transmission part mate with the driving characteristics of the light reflection part.

FIG. 5 is a graph showing transmittance as a function of voltage based on an angle of alignment direction with respect to the pixel electrode in the light transmission part of the transflective liquid crystal display device according to the embodiment.

FIG. 6 is a graph showing reflectance as a function of voltage based on an angle of alignment direction with respect to the pixel electrode in the light reflection part of the transflective liquid crystal display device according to the embodiment.

Referring to FIGS. 5 and 6, according to the transflective liquid crystal display device, when the direction of the pixel electrode forms an angle of 5° to 10° relative to the alignment direction, the optical efficiency is improved. In particular, when the direction of the pixel electrode forms an angle of 5° relative to the alignment direction, the highest optical efficiency is achieved.

According to the embodiment, the pixel electrode is branched into a plurality of pixel electrodes and the common electrode is not branched. However, the scope of the present invention is not limited thereto.

Figure 7:
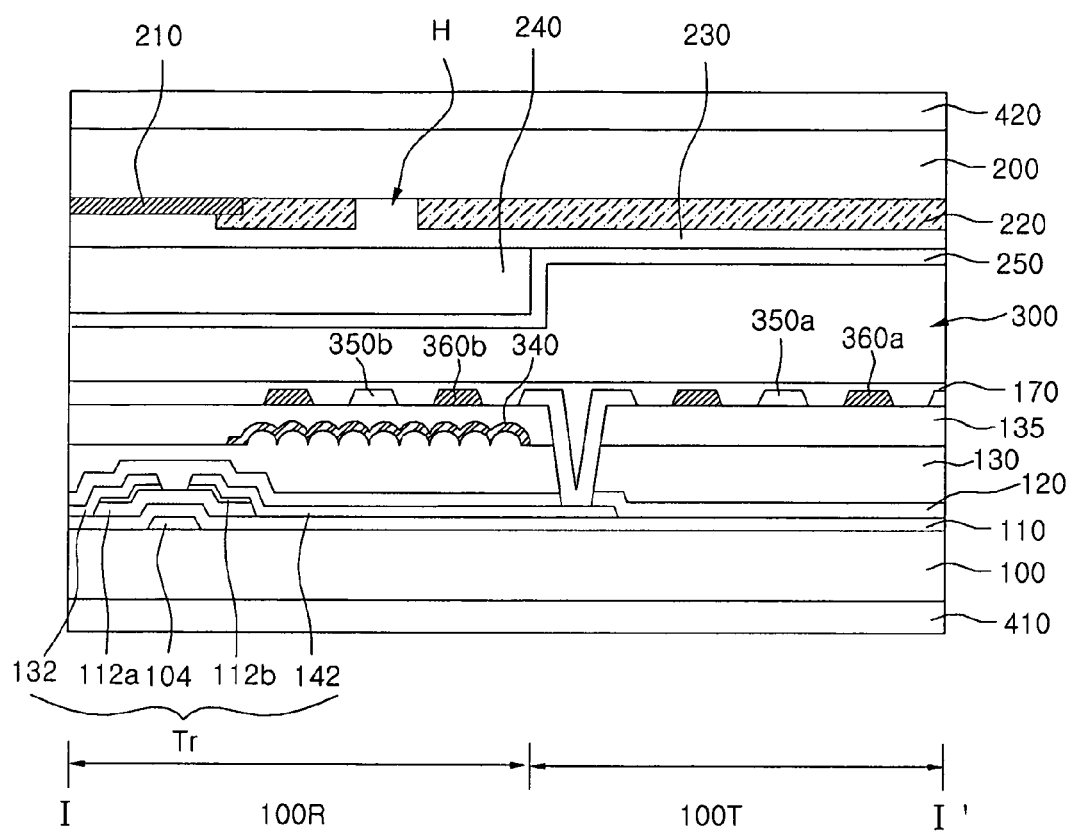
FIG. 7 is a sectional view illustrating a transflective liquid crystal display device according to another embodiment.

FIG. 7 is a sectional view illustrating a transflective liquid crystal display device according to another embodiment. Since the transflective liquid crystal display device according to another embodiment has the same structure as that of the transflective liquid crystal display device according to the previous embodiment, except for the structure of pixel and common electrodes, the same reference numerals are assigned to the same elements and a detailed description will be omitted in order to avoid the redundancy.

Referring to FIG. 7, the liquid crystal display device includes first and second substrates 100 and 200 facing each other, and a liquid crystal layer 300 interposed between the first and second substrates 100 and 200.

A plurality of pixels is defined in the first substrate 100. A thin film transistor Tr is disposed in each pixel. For example, each pixel is classified into a transmission part 100T and a reflection part 100R.

A protective layer 120 and a first insulating layer 130 are disposed on the first substrate 100 including the thin film transistor Tr. The first insulating layer 130 includes an embossing sections 130a corresponding to the reflection part 100R.

A reflective pattern 340 is disposed on the first insulating layer 130 corresponding to the reflection part 100R. In detail, the reflective pattern 340 is disposed on the embossing sections 130a. Further, a second insulating layer 135 is disposed on the first insulating layer 130 while covering the reflective pattern 340. The reflective pattern 340 is isolated from first and second common electrodes and first and second pixel electrodes, which will be described later, by the insulating layer 135. In detail, the reflective pattern 340 is in a floated state.

The first and second pixel electrodes 350a and 350b and the first and second common electrodes 360a and 360b are disposed on the insulating layer 135, in which the first and second pixel electrodes 350a and 350b are electrically connected with the thin film transistor Tr, and the first and second common electrodes 360a and 360b form the horizontal electric field together with the first and second pixel electrodes 350a and 350b. The first common electrode 360a is disposed alternately with the first pixel electrode 350a and the second common electrode 360b is disposed alternately with the second pixel electrode 350b.

In detail, the first pixel electrode 350a is disposed in the transmission part 100T and the second pixel electrode 350b is disposed in the reflection part 100R. Each of the first and second pixel electrodes 350a and 350b are branched into a plurality of pixel electrodes, respectively. Further, the first and second pixel electrodes 350a and 350b may have directivities different from each other. For example, the first and second pixel electrodes 350a and 350b may be inclined while forming an inclination angle of 30° to 60° therebetween. The highest optical efficiency can be achieved when the first and second pixel electrodes 350a and 350b form an angle of 45° therebetween. At this time, the first pixel electrode 350a is inclined at an angle of 5° with respect to a gate line and the second pixel electrode 350b is inclined at a negative angle of 40° with respect to the gate line.

The first common electrode 360a is disposed in the transmission part 100T and the second common electrode 360b is disposed in the reflection part 100R. The first and second common electrodes 360a and 360b is branched into a plurality of common electrodes, respectively.

The first pixel electrode 350a is disposed alternately with the first common electrode 360a, thereby forming the horizontal electric field, i.e. the electric field parallel to the gate line. Similarly to this, the second common electrode 360b is alternately disposed with the second pixel electrode 350b, thereby forming the horizontal electric field.

For example, the first and second common electrodes 360a and 360b may be inclined while forming an inclination angle of 30° to 60° therebetween. The highest optical efficiency can be achieved when the first and second common electrodes 360a and 360b form an angle of 45° therebetween. At this time, the first common electrode 360a is inclined at a positive angle of 5° with respect to the gate line and the second common electrode 360b is inclined at a negative angle of 40° with respect to the gate line.

In order to improve the optical efficiency by matching the liquid crystal driving characteristics of the transmission part 100T with the liquid crystal driving characteristics of the reflection part 100R, alignment layers 170 having different alignment directions are disposed in the transmission part 100T and the reflection part 100R. The transmission part 100T is disposed while forming an angle of 40° to 50° relative to the reflection part 100R. In addition, in order to improve the optical efficiency, the alignment layer 170 may have an alignment angle (a and b) of 5° to 20° with respect to the alignment direction of the pixel electrodes 350a and 350b. In particular, when the alignment layer 170 has an alignment angle (a and b) of 5° with respect to the alignment direction of the pixel electrodes 350a and 350b, the driving characteristics of the transmission part 100T match with the driving characteristics of the reflection part 100R. For example, the transmission part 100T has an alignment angle of 0° with respect to the gate line and the reflection part 100R has an alignment angle of 45° with respect to the gate line.

According to the embodiments as described above, the directivities of the pixel electrodes in the reflection part and the transmission part, the directivities of the pixel electrodes and the alignment directivities of the alignment layers are controlled, so that the viewing angle characteristics can be improved and the optical efficiency can be improved by matching the driving characteristics of the reflection part with the driving characteristics of the transmission part. Thus, an additional compensation film is not required, so that the quality of the liquid crystal display device can be improved and the manufacturing cost can be saved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a first substrate including a transmission part and a reflection part;
   a gate line and a data line crossing each other on the first substrate;
   a common electrode disposed on the transmission part and the reflection part;
   a plurality of first pixel electrodes disposed on the transmission part and having a first electrode direction;
   a plurality of second pixel electrodes disposed on the reflection part and having a second electrode direction, the first electrode direction and the second electrode direction creating an acute angle;
   a second substrate facing the first substrate; and
   a liquid crystal layer interposed between the first and second substrates,
   wherein the first pixel electrode has an angle of 5° with respect to the gate line, and the second pixel electrode has a angle of 40° with respect to the gate line.

2. The liquid crystal display device as claimed in claim 1, wherein the second electrode direction is inclined at an angle of 30° to 60° with respect to the first electrode direction.

3. The liquid crystal display device as claimed in claim 1, further comprising:
   a first alignment layer disposed on the transmission part and having a first alignment direction; and
   a second alignment layer disposed on the reflection part and having a second alignment direction inclined at an angle of 40° to 50° with respect to the first alignment direction.

4. The liquid crystal display device as claimed in claim 3, wherein the first alignment direction is inclined at an angle of 5° to 20° with respect to the first pixel electrode, and the second alignment direction is inclined at an angle of 5° to 20° with respect to the second pixel electrode.

5. The liquid crystal display device as claimed in claim 1, further comprising first and second polarizing members aligned at outer sides of the first and second substrates, respectively, and the optical axes of the first and second polarizing members being perpendicular to each other, wherein an optical axis of one of the first and second polarizing members is parallel to the first alignment direction.

6. The liquid crystal display device as claimed in claim 1, wherein the transmissive and reflective common electrodes are electrically connected with each other at a boundary between the transmission part and the reflection part and are spaced apart from each other at other region at the boundary except a region where the transmissive and reflective common electrodes are electrically connected with each other.

7. A liquid crystal display device comprising:
   a first substrate including a transmission part and a reflection part;
   a gate line and a data line crossing each other on the first substrate
   a plurality of first pixel electrodes disposed on the transmission part and having a first electrode direction;
   a plurality of second pixel electrodes disposed on the reflection part and having a second electrode direction, the first electrode direction and the second electrode direction creating an acute angle;
   a plurality of common electrodes disposed alternately with the first and second pixel electrodes on the transmission part and the reflection part;

a second substrate facing the first substrate; and
a liquid crystal layer interposed between the first and second substrates,
wherein the first pixel electrode has a angle of 5° with respect to the gate line, and the second pixel electrode has a angle of 40° with respect to the gate line.

8. The liquid crystal display device as claimed in claim 7, further comprising a reflective pattern corresponding to the second pixel electrode disposed in the reflection part, isolated from the common electrode and being floated.

9. A method for manufacturing a liquid crystal display device, the method comprising the steps of:
providing a first substrate including a transmission part, a reflection part, and a gate line and a data line crossing each other on the first substrate;
forming a common electrode on the transmission part and the reflection part, a plurality of first pixel electrodes having a first electrode direction on the transmission part, and a plurality of second pixel electrodes having a second electrode direction on the reflection part, the first electrode direction and the second electrode direction creating an acute angle;
providing a second substrate facing the first substrate; and
forming a liquid crystal layer interposed between the first and second substrates,
wherein the first pixel electrode has a angle of 5° with respect to the gate line, and the second pixel electrode has a angle of 40° with respect to the gate line.

10. The method as claimed in claim 9, wherein the second electrode direction is inclined at an angle of 30° to 60° with respect to the first electrode direction.

11. The method as claimed in claim 9, further comprising forming a first alignment layer having a first alignment direction on the transmission part and a second alignment layer having a second alignment direction on the reflection part, the second alignment direction being inclined at an angle of 40° to 50° with respect to the first alignment direction.

12. The method as claimed in claim 11, wherein the first alignment direction forms an angle of 5° to 20° with respect to the first pixel electrode, and the second alignment direction forms an angle of 5° to 20° with respect to the second pixel electrode.

13. The method as claimed in claim 1, wherein the transmissive common electrode includes a transmissive material and the reflective common electrode includes a reflective material.

14. The method as claimed in claim 9, wherein the transmissive common electrode includes a transmissive material and the reflective common electrode includes a reflective material

* * * * *